United States Patent [19]
Brey et al.

[11] 3,850,730
[45] Dec. 3, 1974

[54] DRUM INDEXING MECHANISM

[75] Inventors: Wilhelm Brey, Cuyahoga Falls, Ohio; William Hostetler, Santa Ana, Calif.; Earl Ferdnand Loeffler, Akron, Ohio; Hubert Ernest Kolm, Louisville, Ohio; Fred Grove Elder, Atwater, Ohio

[73] Assignee: The Firestone Tire & Rubber Company, Akron, Ohio

[22] Filed: Sept. 15, 1971

[21] Appl. No.: 180,837

Related U.S. Application Data
[62] Division of Ser. No. 10,579, Feb. 11, 1970, Pat. No. 3,700,526.

[52] U.S. Cl................... 156/394, 156/396, 156/405
[51] Int. Cl............................................ B29h 17/20
[58] Field of Search ........... 156/394, 396, 123, 405, 156/133, 154, 414

[56]         References Cited
         UNITED STATES PATENTS
2,340,267   1/1944   Haase ........................... 156/406 X
3,676,259   7/1972   Appleby et al. ..................... 156/396

Primary Examiner—Clifton B. Cosby

[57] ABSTRACT

A fully automatic machine for producing "green tires" or unvulcanized tire carcasses, especially suitable for making tubeless tires. The machine comprises a plurality of interconnected and dependent assemblies or stations where specialized operations, normally done semi-automatically or by hand, are carried out by mechanical devices acting in sequence. The machine includes a plurality of conventional tire building drums continuously moving between horizontally disposed, stationary table assemblies where innerliner and chafer strips, and first and second ply material are successively wrapped on the drums as they move across the table on which the material is positioned. The wrapped drums from these assemblies, are sent to turrent units where they are arcuately positioned for receiving beads, tread cushion, stitching, strips of whitewall, if required, and are discharged from the collapsed drums for removal and storage. The stripped drums, or drums from which tires are removed, are automatically expanded and recycled through the assemblies for building more tire carcasses.

5 Claims, 3 Drawing Figures

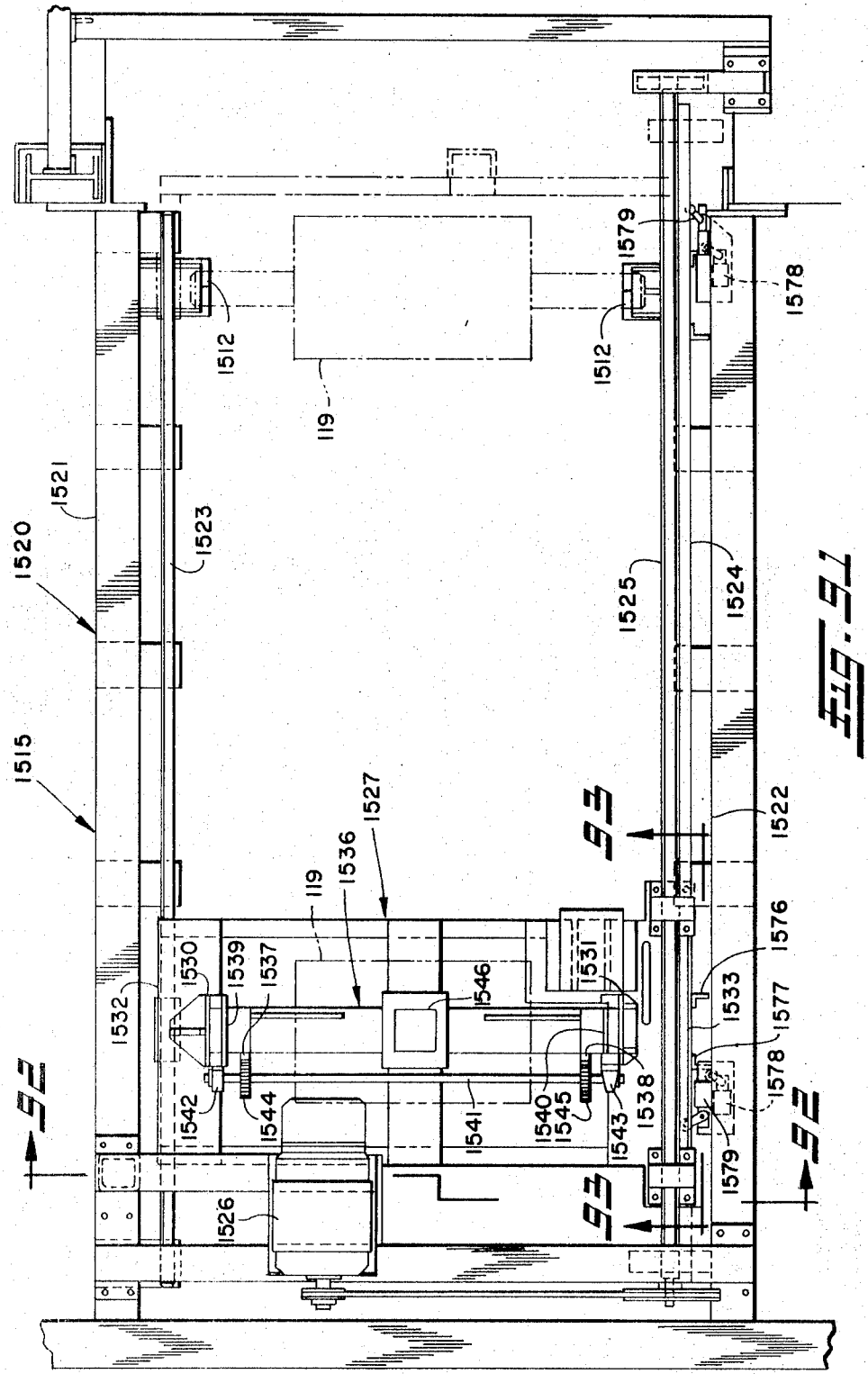

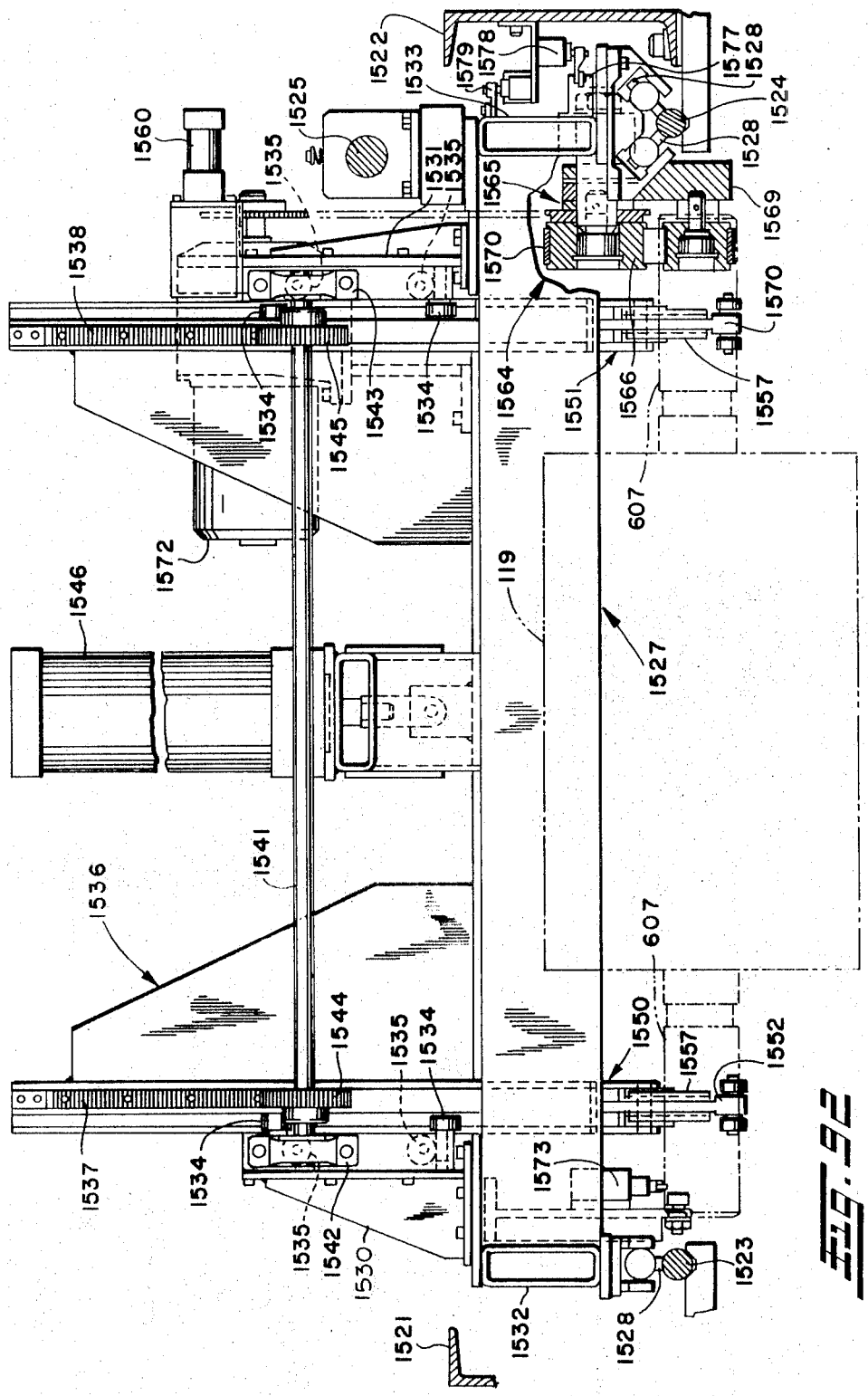

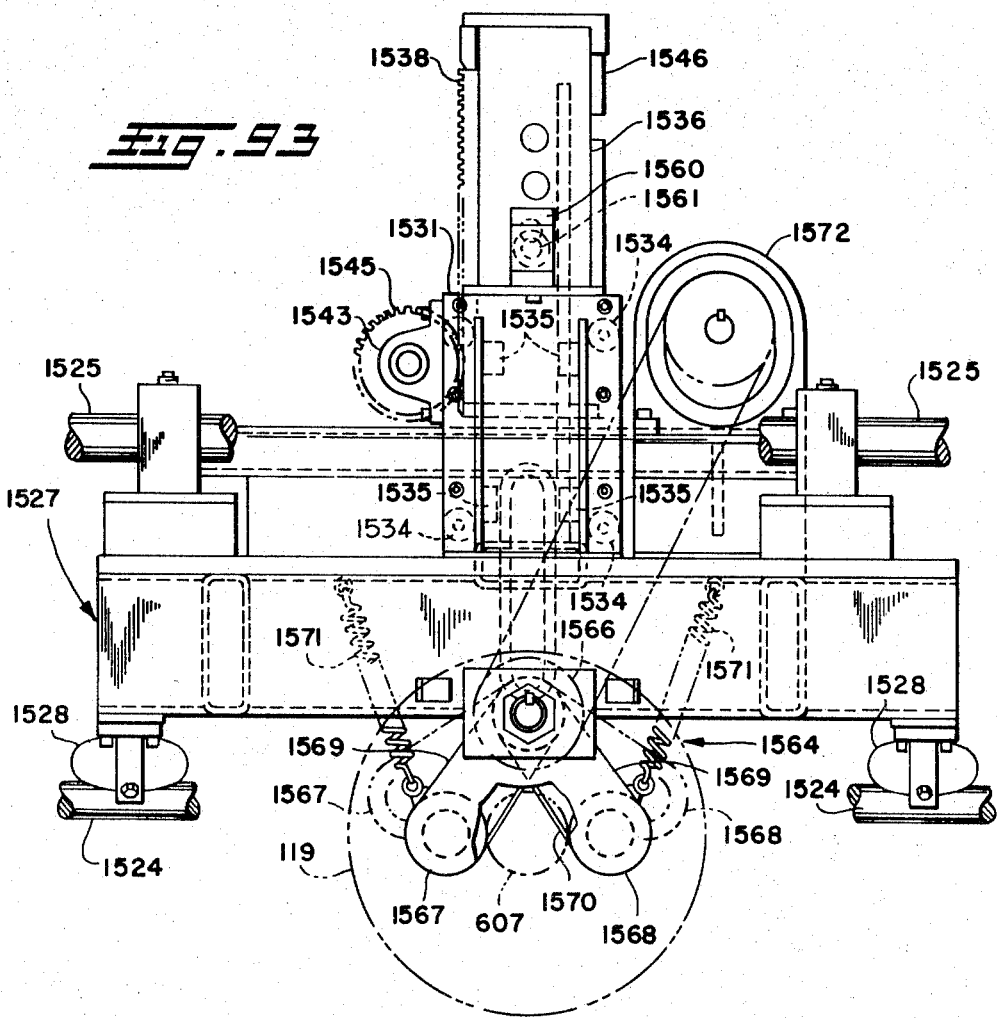

DRUM INDEXING MECHANISM

This is a division of application Ser. No. 10,579, filed Feb. 11, 1970, now U.S. Pat. No. 3,700,526, the disclosure of which is hereby incorporated herein by reference, and which may be consulted for relation between the several inventive concepts of the continuing divided inventions.

FIGS. 1–90 and 94–97 appear in U.S. Pat. 3,700,526 and are incorporated herein by reference.

FIG. 91 is a plan view of an overhead conveyor of the conveying system;

FIG. 92 is a section viewed from the line 92—92 of FIG. 91;

FIG. 93 is a section viewed from the line 93—93 of FIG. 91.

DRUM INDEXER

A drum indexer 1564 (FIGS. 92-93) is provided on the drum carriers 1527 of the overhead conveyors 1515-1517, for indexing or rotating the building drums 119, to a predetermined arcuate position for engaging stock positioned on the IC unit 101, the 1--PLY unit 102, and the 2--PLY unit 103, to arcuately space the splices of stock wrapped on the drums. The drum indexer 1564 comprises a drive pulley assembly 1565, including a drive pulley 1566, which is rotatably mounted on the drum carrier 1527, adjacent the transfer arm 1551 in aligned relation with the building drum shaft 607. A set of drive rollers 1567 and 1568 are each rotatably mounted on a pivot arm 1569, which is rotatably mounted on the drive pulley assembly 1565. The drive rollers 1567 and 1568 are in spaced, aligned relation with the drive pulley 1566. A flexible drive belt 1570 is reeved in triangular relation around the drive pulley 1566 and drive rollers 1567 and 1568. A coil spring 1571 is used to bias the drive rollers 1567 and 1568 in shaft receiving relation (note dotted position of rollers in their rest position).

The drum shaft 607 engages the drive belt 1570 between the rollers 1567 and 1568 when it is lifted into transporting relation with the drum carrier 1527. The drum shaft 607, as it moves upward in engaged relation with the drive belt 1570, forces the drive rollers 1567 and 1568 to move into abutting relation with the drum shaft 607. The drive belt 1570 is reversely reeved halfway around the drum shaft 607 for driving or rotating it in a controlled manner. An electric motor 1572 is connected to the drive pulley 1566 for operating it to rotate the drum 119.

A sensor 1573 is mounted for rolling engagement on the drum shaft 607 to sense any imperfection, such as a projection or indentation, which is deliberately placed on the surface of the drum shaft 607, to mark or identify the arcuate positions of the building drum 119 which it must be in, if the splices are to be properly staggered on the drum 119. Three markings are applied in different locations on each drum shaft 607, and each drum carrier 1527 of the aforementioned conveyors has an appropriately mounted sensor for engaging the particular mark of the aforementioned units involved. It should be readily appreciated that it is immaterial in what position the building drum 119 is picked up, since the indexer 1564 will rotate it until the particular sensor engages its particular marking on the drum shaft 607.

DESCRIPTION OF THE FIGURES OF THE DRAWING

The following description of the invention will be better understood by referring to the annexed drawing, wherein:

A pair of projecting angle bars 1576 and 1577 are fastened in spaced relation on the drum carrier 1577, for engaging two sets of limit switches 1578 and 1579 mounted in spaced relation on the overhead frame 1520. The first set of switches 1578 act to slow down the drum carrier 1527 and the second set of switches 1579 act to stop the drum carrier 1527 for picking up or depositing building drums 119. The building drums 119 are in drum transferring relation to the drum carrier 1527, when the operating air cylinder 1546 is fully retracted.

What is claimed is:

1. A mechanism for indexing a tire building drum, to arcuately space the splices of material wrapped on the drum, comprising:
   a. a plurality of spaced pulleys;
   b. flexible belt means reeved around the pulleys for engaging a shaft extending from the drum, between a pair of adjacent pulleys;
   c. means for rotating at least one of the pulleys to drive the belt and rotate the drum shaft engaged thereby; and
   d. at least one cam means for stopping rotation of said at least one pulley when the drum is in a predetermined arcuate position, where the splice of material wrapped thereon is in staggered relation to the splice of material about to engage the drum.

2. The machine of claim 1, which includes means for pivotally mounting said two adjacently disposed pulleys, for movement towards each other when the shaft of the drum is moved into engagement with the belt between said pulleys.

3. The machine of claim 2, wherein the at least one cam means for stopping rotation of the pulley includes at least one a sensing device positioned in predetermined relation on the shaft; a sensing mechanism disposed fixed relation to the shaft for engaging the sensing device thereon; and means for disengaging the pulley rotating means, when the sensing device and mechanism engage.

4. The machine of claim 3, wherein the sensing device and mechanism include a disruption in the smooth cam surface of the shaft and a cam follower for rolling engagement on the cam surface.

5. In a tire building machine, a mechanism for indexing a drum between applications of tire ply material, to arcuately stagger or space the splices of the material on the drum, the mechanism comprising:
   a. three pulleys disposed in triangular spaced relation;
   b. means for mounting two of the pulleys for movement towards and away from each other;
   c. means for mounting the third pulley in fixed relation to the two movable pulleys;
   d. a continuous belt reeved around the pulleys and enclosing them;
   e. means for holding the two movable pulleys in biased triangular forming relation to the third pulley;
   f. means for rotating the fixed pulley when a shaft, extending from the drum, engages and moves the belt between the two movable pulleys and becomes partially wrapped therein;

g. at least one cam follower disposed adjacent the pulleys for rolling engagement on the shaft of the drum, as it rotates; and h. means associated with the cam follower for stopping rotation of the fixed pulley, when the cam follower engages a predisposed disruption in the smooth cam surface of the shaft.

* * * * *

UNITED STATES PATENT OFFICE
CERTIFICATE OF CORRECTION

Patent No. 3,850,730          Dated November 26, 1974

Inventor(s) Wilhelm Brey et al.

It is certified that error appears in the above-identified patent and that said Letters Patent are hereby corrected as shown below:

The patent issue date should read -- November 26, 1974 --.

Column 2, line 8, "1577" should read -- 1527 --.

Signed and sealed this 3rd day of June 1975.

(SEAL)
Attest:

RUTH C. MASON
Attesting Officer

C. MARSHALL DANN
Commissioner of Patents
and Trademarks